May 2, 1944. A. G. FRAZER-NASH ET AL 2,347,900
MOTION TRANSMITTING AND CO-ORDINATING MEANS
Filed April 17, 1941
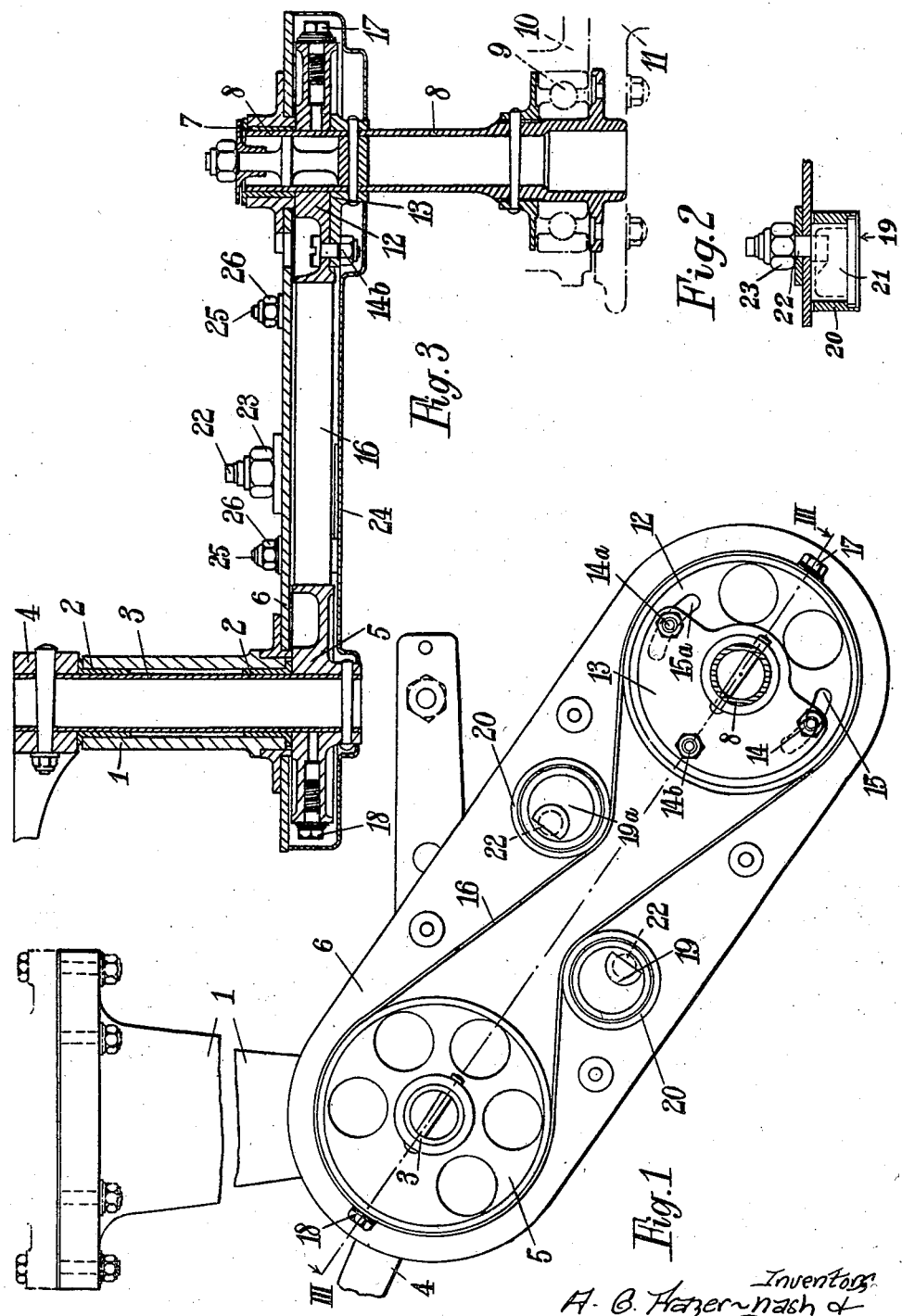
Inventors
A. G. Frazer-Nash &
S. R. Proctor
by Glascock Downing & Seebold
Attys.

Patented May 2, 1944

2,347,900

UNITED STATES PATENT OFFICE 2,347,900

MOTION TRANSMITTING AND CO-ORDINATING MEANS

Archibald Goodman Frazer-Nash, Tolworth, and Stuart Russell Proctor, Almondesbury, England Application April 17, 1941, Serial No. 389,078
In Great Britain November 7, 1939

1 Claim. (Cl. 74—222)

This invention relates to means for securing co-ordination of motion between two or more members.

In many forms of mechanism it is impracticable to fix a member rigidly to another member or a mounting for both of such members in effectively rigid angular relationship one with another. Such is the case, for instance, in connection with precision instruments where the angular position of a shaft has to be indicated at a point lying off the axis of the shaft.

For this reason it has been proposed to mount one member, which may be referred to as a primary member with respect to the other member, which may be referred to as a secondary member, so that the former may move in a given direction about an axis parallel to the axis about which the latter moves but not coincident with it.

Primary members moving in this way have been arranged so that they are carried by a shaft running in bearings accurately parallel to the bearings of the other member, that is, the secondary member, and the motion thereof about such bearings is communicated to the primary member by links. Such a device has three disadvantages:

(1) If the distance between the two centres of rotation varies slightly, an error is introduced.

(2) For large ranges of angular movement it is difficult with links to avoid angular regions where "dead centre" effects put considerable strain on the links and bearings.

(3) Several mechanical bearings are introduced each of which may introduce errors due to clearances or back-lash.

The object of the present invention is to provide mechanism for use in the conditions above indicated which will be free from these disadvantages and which shall in addition be adapted to be readily adjusted in the "harmonizing" of the primary and secondary member, that is to say, lining up the angular relation between the axis of the one part and the axis of the other to take account of individual error in both components.

According to the invention, a support bracket for one of the members, that is, the primary member (which may be rigidly attached to the mounting rotatable about a normally vertical axis but not about a normally horizontal axis), is furnished with bearings for a shaft carrying an arm forming part of the primary member and a wheel arranged in driving connection with a wheel engaged on a shaft supported in bearings provided in an extension which is rigidly secured to the bracket and also in bearings provided in an element rigidly attached to the mounting containing the bearings in which the secondary member rotates about a normally horizontal axis the axis of the shaft being co-axial with the axis about which motion about a normally horizontal axis is imparted to the secondary member.

On the end of the shaft in question there is carried an element which is part of a cradle for the secondary member, that is to say, an element which moves with the secondary member about a normally horizontal axis.

Preferably in accordance with the invention, the last-mentioned shaft is not directly connected with the wheel mounted upon it, but is connected with the wheel through a sector keyed or similarly secured to the shaft and which is in turn connected with the wheel by means permitting relative rotation of the wheel and the sector in "harmonizing" or lining up the primary and secondary members, initially or as occasion may require.

For instance, in accordance with the invention, the sector has secured to it rigidly two bolts extending through slots furnished in the wheel.

Optionally in accordance with the invention, after the initial adjustment for lining up, the sector is rigidly engaged with the wheel by drilling a hole through both the sector and the wheel and securing therein a screw and nut, or alternatively, a pin.

The driving connection between the wheels is effected by a belt which is as inextensible as possible, and may be a thin strip of metal.

For preventing slip between the belt and the wheels, any appropriate means may be provided. Preferably for this purpose the belt is secured at a convenient point to one of the wheels with which it is in driving connection, and also at a convenient point with the other of the wheels, by for instance screws.

Tensioning means will normally be provided for taking up the slack in the belt and such means may also function in securing the final "harmonization" or lining up of the two members.

To this end two jockey pulleys eccentrically mounted may be provided.

For instance, the jockey pulleys each comprise a sleeve running on journals or ball races secured to shafts eccentrically positioned with respect to the axis of rotation of the sleeve, the shafts in question being arranged to be rotated and furnished with means for locking them into the position into which they are adjusted.

The extension rigidly secured to the bracket may be generally in the form of a plate with which is associated a casing adapted to cover and protect the wheels above referred to and the driving connection between them.

The invention will be described further in detail and by way of example with reference to the accompanying drawing, in which:

Figure 1 is a view in elevation of a construction in accordance with the invention with the cover for the central mechanism removed;

Figure 2 is a view in section of an element of the construction;

Figure 3 is a view in section taken on a plane indicated by the line III—III of Figure 1.

In the construction illustrated a support bracket 1 which may be secured to a mounting, is furnished with a bearing 2 for a shaft 3 which carries on one end an arm 4 to which the primary member is secured.

On the other end of the shaft there is secured a plain flanged wheel 5 and adjacent to one end of the plate 6 which is secured and forms an extension of the bracket there is furnished a bearing 7 for a shaft 8 one end of which is rotatable in bearings 9 provided in a fixed bracket 10 and to the end of the shaft there is rigidly secured the secondary member 11, the axis of the shaft in question being coaxial with the axis about which motion about a normally horizontal axis is imparted to the secondary member.

The shaft in question is not directly connected with the wheel 12 mounted on it, the connection between the wheel and the shaft being effected through the sector 13 pinned to the shaft and in turn connected with the wheel by means of two bolts 14 and 14a engaged in holes in the sector, and extending through slots 15, 15a furnished in the wheel so that the wheel in question may be rotated relatively to the sector and secured in relation to the sector in harmonizing or lining up the primary and secondary members initially or as occasion may require.

After this harmonizing has been effected the sector is preferably rigidly engaged with the wheel by drilling a hole through the sector and wheel when in the adjusted position and passing a bolt 14b through the hole.

The driving connection between the wheel 12 and the wheel 5 is effected in the construction illustrated by a belt 16 which is as inextensible as possible and may be a thin strip of metal.

For preventing slip between the belt and the wheels the belt is secured to one of the wheels at an appropriate point by a screw 17 and with the other of the wheels by the screw 18.

For taking up the slack in the belt and for securing final harmonization in lining up the primary and secondary members, there are provided two jockey pulleys 19 and 19a. These jockey pulleys each comprise a sleeve 20 running on a journal 21 from which extend shafts 22 eccentrically engaged in the journals and furnished with nuts 23 by which, when the shaft has been rotated, they may be secured in a fixed position.

To protect the wheels and driving belt a cover plate 24 is secured to the plate 6 by means of screws 25 and nuts 26.

With the arrangement described any angular movement of the secondary member will rotate the shaft connected with it, and such rotation will, in addition, effect rotation of the shaft engaged with the bracket and connected with the primary member.

The main adjustment between the primary and secondary members in this construction is effected, as above explained, by relative rotation of the sector and the wheel with which it is associated and locking the two together and any fine adjustment needed may be effected by the differential rotation of the eccentrically mounted jockey pulleys, in such manner as to take up the slack in the belt to an increased or diminished degree on one side and a diminished or increased degree on the other side.

While at many points the expression "secondary member" is used in the singular, it is to be understood that the invention extends to arrangements in which there are a plurality of secondary members associated with a primary member.

We claim:

Mechanism for securing coordination of motion of two members comprising a rigid bracket, a bearing in the bracket, a shaft rotatably engaged in the bearing, a wheel on the said shaft, an extension rigidly secured to the bracket, a bearing in the said extension, a second rigid bracket, a bearing in the second bracket in axial alignment with the bearing in the extension, a second shaft supported in the two last mentioned bearings, a wheel rigid with the second shaft and an inextensible driving belt pinned to this wheel and to the first-mentioned wheel, and tensioning means for taking up the slack in the belt, said tensioning means comprising a jockey pulley engaging against the portion of the belt extending one on one side of the plane in which the axes of the shafts lie and a jockey pulley engaging against the portion of the belt on the other side of the said plane, bearings for the two jockey pulleys, eccentric mountings for said pulley bearings adapted to permit the position of the jockey pulleys to be adjusted to take up a greater or less degree of slack in the belt and to facilitate by the individual adjustment of their positions the harmonizing of the two members.

ARCHIBALD GOODMAN FRAZER-NASH.
STUART RUSSELL PROCTOR.